Oct. 6, 1964 R. J. MATT 3,151,702
ZERO GRAVITY LUBRICATING SYSTEM
Filed Aug. 24, 1960 2 Sheets-Sheet 1

Inventor
Richard J. Matt

Oct. 6, 1964   R. J. MATT   3,151,702
ZERO GRAVITY LUBRICATING SYSTEM
Filed Aug. 24, 1960   2 Sheets-Sheet 2

Inventor
Richard J. Matt

United States Patent Office 3,151,702
Patented Oct. 6, 1964

3,151,702
ZERO GRAVITY LUBRICATING SYSTEM
Richard J. Matt, South Euclid, Ohio, assignor to Thompson Ramo Wooldridge Inc., Cleveland, Ohio, a corporation of Ohio
Filed Aug. 24, 1960, Ser. No. 51,720
9 Claims. (Cl. 184—6)

The present invention relates to improvements in lubricating systems and particularly to an improved system suitable for use at zero gravity conditions.

In aircraft and rockets operating beyond the earth's gravity the problem of how to handle free fluids becomes prominent with respect to the lubricant and fuel inasmuch as these liquids have a tendency to float in space. It is necessary to transfer lubricant easily for satisfactory lubrication of parts.

Accordingly, it is an object of the present invention to provide an improved lubricating system well suited for operation at zero gravity conditions wherein the fluid lubricant is under control and is efficiently transferred and circulated to be supplied to surfaces requiring lubrication.

Another object of the invention is the provision of a lubrication system having a reservoir wherein the lubricant is always maintained at a reservoir outlet regardless of the position of the reservoir and at zero gravity conditions.

A further object of the invention is the provision of a lubrication system well suited for use with a turbine-driven auxiliary power unit wherein the pressure of the turbine operating fluid is utilized for control and transfer of the lubricant.

A further object of the invention is the provision of a lubricating system wherein a pressurized gas is employed for carrying lubricant from a housing and filters are employed for separating the lubricant from the gas.

Another object of the invention is the provision of a lubrication system well suited for use at zero gravity conditions wherein centrifugal force on the lubricant caused by rotating parts and kinetic energy of the moving lubricant is used for aid in the transfer of the lubricant.

Another object of the invention is to provide an improved lubricating system wherein parts are shaped for improved collection and control for transfer of the lubricant.

Other objects and advantages will become more apparent with the teaching of the principles of the invention in connection with the disclosure of the preferred embodiments thereof in the specification, claims and drawings, in which:

As shown on the drawings.

Figure 1:
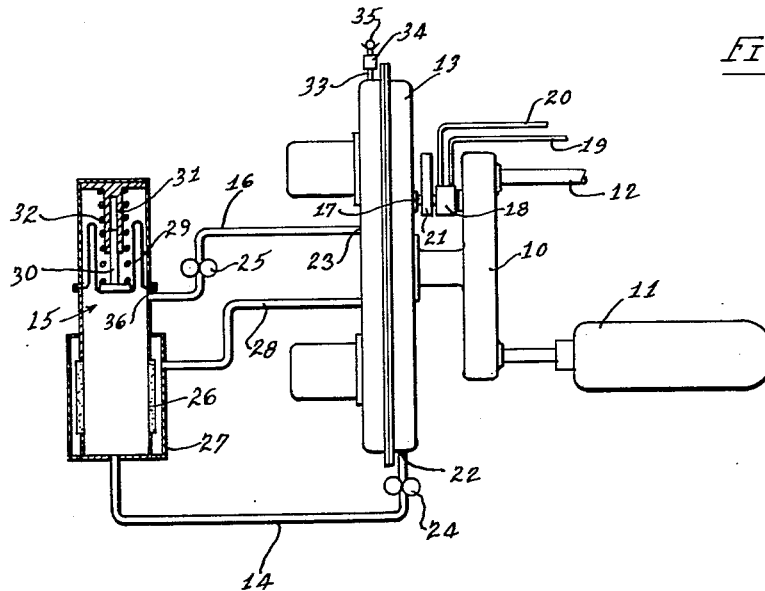
FIGURE 1 is an elevational view shown in somewhat schematic form with parts in section of a mechanism provided with a lubrication system in accordance with the principles of the present invention.
Figure 2:
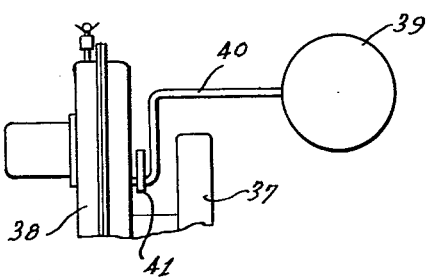
FIGURE 2 is a fragmentary view of a modified form of the arrangement of FIGURE 1.
Figure 3:
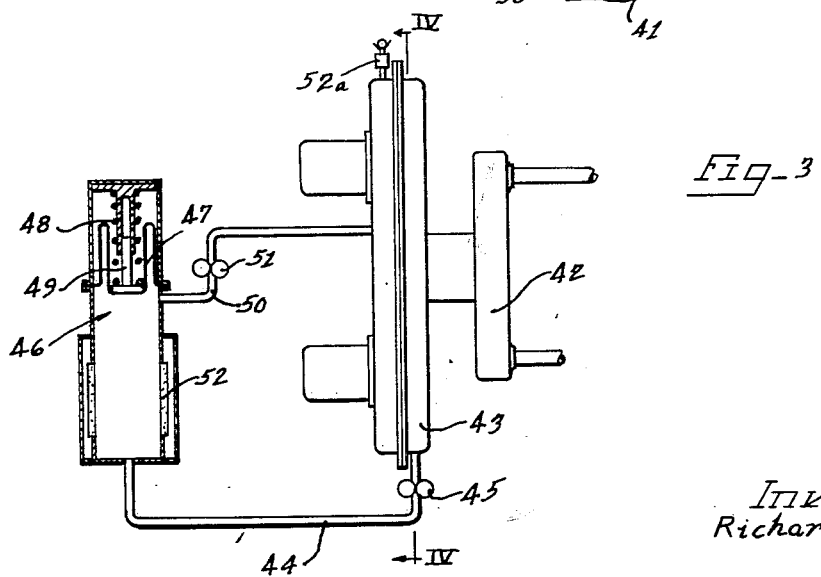
FIGURE 3 is an elevational view shown in somewhat schematic form and with parts in section of another form of the invention.

The arrangement of FIGURES 1 and 2 employs gas pressure for controlling and transferring the lubricant while the arrangement of FIGURES 3 through 6 employs a mechanical force. As will be appreciated by those skilled in the art features of each of the systems may be incorporated in the other system obtaining the advantages available.

In FIGURE 1, an engine operated by a pressurized fluid supplies an operating force and is preferably in the form of a turbine 10 provided with pressurized operating gas from fuel from a fuel tank 11 and the turbine exhausts through an exhaust line 12. The fuel in the tank 11 is of the liquid or solid type and a suitable combustion chamber is provided for burning the fuel and creating hot pressurized gas for the turbine. Monopropellant or bipropellant fuels may be employed.

The turbine 10 is connected by a shaft to driving elements which are preferably in the form of gears located and mounted for rotation within a gear box or housing 13. The gears are suitably connected by mechanism not shown to appropriate power accessories which are suspended on the gear box. Lubricant for the gears and moving parts is supplied at proper locations within the gear box and flows from the gear box through a lubricant drain conduit 14 into a lubricant reservoir 15 and is returned to the gear box to lubricate the surfaces of the parts therein through a return conduit 16.

A suitable liquid lubricant is employed which will operate at temperatures encountered and preferably a lubricant which will not oxidize with contact with the operating gas from the turbine for reasons which will become clear.

The major problem in a system of this type which will be carried with a rocket or airship to a location of zero gravity is the handling of free fluids and in particular the lubricant. In the reservoir 15 merely pressurizing the surface of the lubricant at zero gravity conditions will not maintain the lubricant at the outlet from the reservoir. Also, the lubricant will not at zero gravity conditions normally flow into an outlet from the gear box housing 13. The mechanism employs pumps for moving the lubricant through the conduits and maintains the lubricant at the outlet reservoir by maintaining a movable wall in engagement with the free surface of the liquid, and carries the lubricant out of the gear box by maintaining a slight positive pressure within the gear box by bleeding gas into the box and permitting the lubricant to flow through the outlet with the gas.

A pressure differential is created between the housing 13 and the reservoir 15 to move the lubricant out of the housing and for this purpose a small amount of the pressurized operating gas for the turbine is bled into the housing 13 by a pressure bleed line 17. The gas pressure provides means in the housing to carry the lubricant out. As illustrated, the pressure bleed line 17 extends to bleed pressurized operating gas from the turbine and preferably from the back of the turbine wheel. A cooler 18 cools the turbine exhaust gases and a pressure regulating control 21 is positioned in the line 17 to control the pressure supplied to the housing 13. The cooler 18 is provided with a suitable cooling medium through inlet and outlet lines 19 and 20. The cooler may be of the simple fin type as will be recognized by those skilled in the art and may use a lubricating or possibly a cryogenic fluid to cool the gases from the turbine.

Connected in the drain conduit 14 is a scavenge pump 24 and the suspended gas-lubricant mist formed in the housing 13 flows through an outlet 22 out of the housing into the conduit 14 and is pumped to the reservoir 15. While only one pump 24 is shown in FIGURE 1 to simplify the drawing, a number of scavenge pumps are preferably connected to different locations in the gear box and each are connected to discharge to the drain conduit 14. These pumps are highly efficient scavenge pumps capable of pulling up to 29 inches of mercury vacuum. At sea level the unit is closed and a slight positive pressure is maintained in the housing 13.

In the reservoir 15 the gas and lubricant pumped by the scavenge pump 24 is separated and lubricant is returned to the housing 13 by means of a pump 25 placed in the return conduit 16 which connects to an inlet 23 into into the housing 13.

To separate the gas from the liquid a filter 26 is connected to the reservoir 15. Filters such as stainless steel sintered filters may be employed arranged around the periphery of the reservoir and by the proper selection of the porosity of the filters they will be incapable of passing the lubricant but the gas will escape. A plenum chamber 27 surrounds the filters to receive the gas and a gas return line 28 connects between the plenum chambers and the gear box housing 13 for the return of gas.

To prevent the creation of voids and insure that the lubricant will always be present at an outlet 36 from the reservoir to flow into the return conduit 16, a movable wall 29 is continually urged against the free surface of the liquid lubricant in the reservoir. The movable wall is illustrated in the form of a flexible diaphragm secured across the chamber of the reservoir and backed by a movable piston 30 having a head and having a stem slidable in a guide 31 on the reservoir. A coil compression spring 32 urges the piston 30 against the diaphragm.

Excess gas in the gear box housing escapes through a vent line 33 which is controlled by a pressure relief valve 35 that maintains the housing 13 under a positive pressure. A filter 34 is in the line 33 to pass only gas and retain lubricant within the housing. This filter 34 may also be of stainless steel sintered metal.

In the form shown in FIGURE 2, a turbine 37 is connected to a gear box housing 38. In this arrangement, a gas supply container or bottle 39 is provided to supply gas for pressurizing the housing 38. The bottle connects to the housing by a line 40 provided with a control device 41.

A bottle preferably supplies either a reducing gas or an inert gas which helps prevent the oxidation of the lubricant thereby providing longer life for the lubricant and the unit and enabling a wider selection of suitable lubricants. This eliminates the need for a cooler, such as shown in FIGURE 1 and a bleeding arrangemet for the turbine. The remainder of the system will be subsantially the same as illustrated in FIGURE 1.

In FIGURES 3 through 6, a turbine 42 is provided connected to a gear box housing 43. Lubricant leaves the housing through a scavenge or drain conduit 44 aided by a scavenge pump 45 and the lubricant is delivered to a reservoir 46. The free surface of the lubricant is engaged by a diaphragm 47 backed by a piston 49 that is supported by a spring 48. The lubricant leaves through a return conduit 50 having a pump 51 therein and the lubricant is delivered to the surfaces to be lubricated which are within the housing 43. The reservoir may be provided with a filter 52 permitting the escape of gas although no gas is introduced into the housing 43 as is the case with the systems of FIGURES 1 and 2. A gas escape filter 52a may also be provided on the housing although not essential. The filters 52 and 52a are vented to atmosphere. As will be appreciated by those skilled in the art in some instances the systems could be combined so that the transfer of lubricant is facilitated with the aid of both a pressurized gas arrangement as shown in FIGURES 1 and 2 and a mechanical system as shown in FIGURES 3 through 6.

Figure 4:
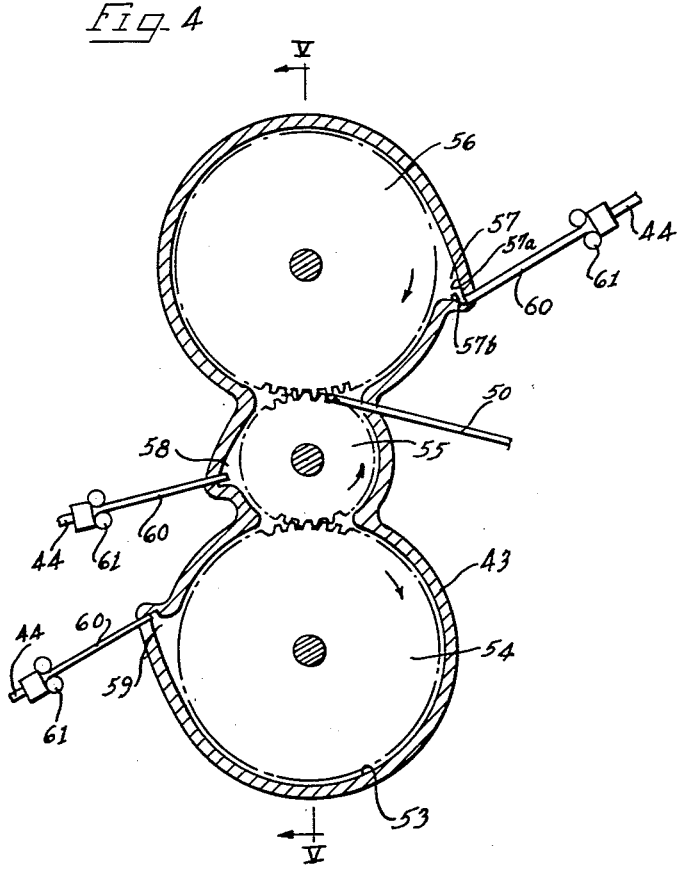
FIGURE 4 is a vertical sectional view taken substantially along line IV—IV of FIGURE 3.
Figure 5:
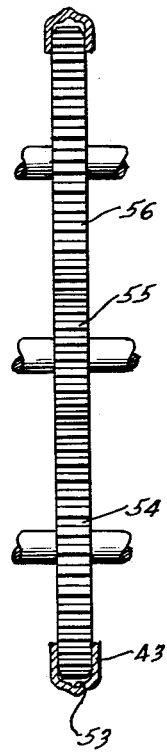
FIGURE 5 is a vertical sectional view taken substantially along line V—V of FIGURE 4.

Within the gear box housing 43 are gears 54, 55 and 56, FIGURES 4 and 5. The housing interior is a confined space of relatively close clearance and kinetic energy is imparted to the lubricating fluids by centrifugal force and by engagement with the rotating parts. The rotating parts include the gears, the supporting bearings and shafts and slingers. Along the outer periphery of the gears within the housing is a groove 53 that receives the lubricant moved outwardly by contact with the moving parts. This groove acts as a collecting chamber for the lubricant that is thrown off of the gears due to centrifugal force. The lubricant which lubricates parts and acts as a coolant is carried by the gears to the opening side of the gears in the direction of rotation. It is received in the housing at the closing side of the gears, as illustrated in FIGURE 4, through the return conduit 50. This prevents foaming and splashing and permits the lubricant to better adhere to the surfaces.

Located just before the closing side of each pair of gears is a plenum chamber, as illustrated by the chambers 57, 58 and 59.

The chambers 57, 58 and 59 have a tapering opening wall such as shown at 57a for the chamber 57, and a radial back wall 57b, for collecting the lubricant. The plenum chambers 57, 58 and 59 are in communication with the groove 53 and each plenum chamber acts as an accumulation area for the lubricant being moved by the gear teeth. In each of the chambers is a scavenge drain 60 which leads to a scavenge pump 61 connected to the drain conduit 44 leading back to the reservoir 46.

This system will not steal pressure off the back of the turbine and the gear box can be vented to atmosphere or placed in a sealed inert atmosphere.

Figure 6:
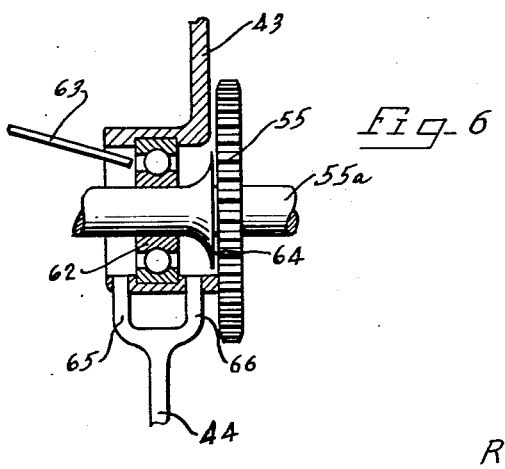
FIGURE 6 is an enlarged sectional view taken through a bearing arrangement for the mechanism.

As illustrated in FIGURE 6, a shaft 55a carrying the gear 55 is supported in a bearing 62. Lubricant is delivered through the return conduit 63 on the outer side of the bearing 62. A slinger ring 64 is positioned on the exhaust side of the bearing to throw the lubricant into the annulus between the gear box housing 43 and the gear 55. In order to eliminate the tendency for the lubricant to flood the bearing, scavenge drains 65 and 66 are positioned on each side of the bearings and these drains connect to the drain conduit 44 to drain off excess lubricant. The arrangement of FIGURE 6 while preferably employed with the mechanical system of FIGURES 2 through 5 can also be utilized in the arrangement of FIGURES 1 and 2.

As a brief summary of operation, with reference to FIGURE 1, a small amount of exhaust gas is bled off the back side of the turbine 10 through a line 17 and cooled by a cooler 18. The gas pressurizes the housing 13 and the gas and lubricant mixture are moved by scavenge pump 24 through the reservoir 15 where the gas is removed by a filter 26. Clear lubricant is returned to the gear box through a conduit 16. Thus the lubricant is circulated through the conduits 14 and 16 which with the reservoir provide a conduit means for circulation of the lubricant, and gas is removed from the lubricant in the conduit means during circulation. The circulation system of the arrangement of FIGURES 3 through 6 is similar although instead of removing the lubricant with a gas it is mechanically carried out of the housing 43. While the lubricant is moved through the conduits by the pumps 45 and 51, in the arrangement of FIGURES 2 through 6, some force for moving the lubricant is obtained by the centrifugal force of the gears.

Thus it will be seen that I have provided an improved mechanism and lubrication system well suited for zero gravity conditions meeting the objectives and advantages above set forth. The system is uncomplicated in structure and reliable and capable of withstanding shocks and adverse conditions to which it may be subjected.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a lubrication system for zero gravity conditions, a housing for apparatus having surfaces to be lubricated having an outlet, means for pressurizing said housing to force lubricant into said outlet, a lubricant reservoir, a lubricant drain conduit means connected between said housing outlet and reservoir, a lubricant return conduit means connected between said housing and reservoir to deliver lubricant to apparatus in the housing, pump means for causing a circulation of lubricant through said reservoir and conduit means, a gas filter connected to the reservoir incapable of passing the lubricant but permitting the escape of gas from the chamber whereby gas mixed with the lubricant is removed, a plenum chamber positioned to receive gas passing said filter, and a gas return conduit means connected to the plenum chamber and to the housing for directing gas back to the housing.

2. A lubrication circulation system for zero gravity conditions comprising a housing for apparatus having surfaces to be lubricated and having an outlet, means for pressurizing said housing with a gas to cause a flow of lubricant and gas through said outlet, lubricant conduit means leading from said outlet back to said housing for lubricating apparatus in the housing, pump means for causing a circulation of lubricant through said conduit means, means for separating gas from the lubricant pumped by said pump means, and a gas pressure relief filter in said housing incapable of passing a lubricant but passing gas for relieving excess gas from the housing.

3. In combination an engine for operation by a pressurized fluid, a source of pressurized fluid for operating the engine, apparatus operated by the engine having surfaces to be lubricated, a housing for said apparatus having an outlet, conduit means for circulating lubricant from said outlet to the apparatus to be lubricated, means for bleeding said pressurized fluid into said housing to carry fluid and lubricant through said outlet, and filter means for separating fluid from the lubricant flowing through said conduit means.

4. In combination a turbine for operation by a pressurized fluid, a source of pressurized fluid for operating the turbine, apparatus operated by the turbine having surfaces to be lubricated, a housing for said apparatus having an outlet, conduit means for circulating lubricant from said outlet to the apparatus to be lubricated, means connected to said housing and to the turbine for bleeding fluid from one of the stages of the turbine into the housing at a reduced pressure to carry fluid and lubricant through said outlet, and filter means for separating fluid from the lubricant flowing through said conduit means.

5. In combination a turbine for operation by a pressurized heated fluid, apparatus operated by the turbine having surfaces to be lubricated, a housing for said apparatus having an outlet, conduit means for circulating lubricant from said outlet to the apparatus to be lubricated, means connected to said housing and to the turbine for bleeding turbine operating fluid from the turbine into the housing at a reduced pressure to carry fluid and lubricant through said outlet, means for cooling said bled fluid before it enters the housing, and filter means for separating fluid from the lubricant flowing through said conduit means.

6. In a lubrication system for zero gravity conditions, a closed lubrication circuit having elements arranged in series flow relationship including a reservoir for collecting lubricant having an inlet and an outlet, a lubricant drain conduit means connected to the reservoir inlet for the flow of lubricant from an area to be lubricated, a lubricant return conduit means connected to the reservoir outlet for delivering lubricant to said area, a sealed bearing housing between said return and said drain conduit means having said area to be lubricated and adapted to receive a positive supply of lubricant from the return conduit means, pressure means within the reservoir maintaining the lubricant in the reservoir at said outlet regardless of reservoir position so that the lubricant will always flow into said return conduit means regardless of gravity conditions, and a pressure gas inlet means leading into said housing for forcing lubricant and gas from the housing to the return conduit means.

7. In a lubrication system for zero gravity conditions, a closed lubrication circuit having elements arranged in series flow relationship including a reservoir for collecting fluid lubricant having an inlet and an outlet, a sealed housing having surfaces to be lubricated, a lubricant drain conduit means connected between the reservoir inlet and housing for the flow of lubricant from said housing, and a pressure gas inlet means leading into said housing for forcing lubricant and gas from the housing to said drain conduit means, a lubricant return conduit means connected to the reservoir outlet and to the housing for delivering lubricant to the housing, a movable wall in said reservoir, and means resiliently urging said wall into contact with the free surface of the lubricant preventing the formation of a void space in the reservoir holding lubricant at said outlet so that the lubricant will always flow into said return conduit means regardless of gravity conditions.

8. In a lubrication system for zero gravity conditions, a closed lubrication circuit having elements in series flow relationship including a reservoir for collecting fluid lubricant having an inlet and an outlet, a sealed housing having surfaces to be lubricated, a lubricant drain conduit means connected between the reservoir inlet and the housing for the flow of lubricant from the housing, a pressure gas inlet means leading into said housing for forcing lubricant and gas from the housing to said drain conduit means, a lubricant return conduit means connected between the reservoir outlet and housing for delivering lubricant to said housing, pressure means within the reservoir maintaining the lubricant at said outlet regardless of the quantity of lubricant in the reservoir and the position of the reservoir so that the lubricant will always flow into said return conduit means regardless of gravity conditions, and a gas filter connected to the reservoir incapable of passing lubricant but permitting the escape of gas from the reservoir whereby gas mixed with the lubricant is removed and only liquid lubricant is delivered to the lubricant return conduit means.

9. A lubrication system capable of operation under zero gravity conditions comprising a housing containing bearing surfaces to be lubricated, a recirculation line having an inlet end connected to the housing and an outlet end connected to the housing for directing lubricant to said surfaces, pressure gas supply means connected to the housing supplying a flow of lubricant removing gas to the housing for removing combined gas and lubricant through said inlet end of said line, means interposed in said line for separating gas in the lubricant from lubricant in the line, and a chamber with a biased movable wall interposed in said line for maintaining a constant pressure on lubricant delivered from said chamber to the housing.

References Cited in the file of this patent

UNITED STATES PATENTS

| | | |
|---|---|---|
| 2,024,336 | Cavanaugh | Dec. 17, 1935 |
| 2,417,747 | Flowers | Mar. 18, 1947 |
| 2,577,658 | Kenoszt | Dec. 4, 1951 |
| 2,672,278 | Newcomb | Mar. 16, 1954 |
| 2,809,596 | Sullwold et al. | Oct. 15, 1957 |
| 2,830,609 | Korsak et al. | Apr. 15, 1958 |
| 2,834,432 | Sacks | May 13, 1958 |
| 2,857,020 | Otto | Oct. 21, 1958 |